June 19, 1956  V. B. FORBES  2,751,062
DUMP ELEVATOR

Filed Aug. 25, 1953  2 Sheets-Sheet 2

Vernal B. Forbes
INVENTOR.

BY
Attorneys

United States Patent Office 2,751,062
Patented June 19, 1956

2,751,062
DUMP ELEVATOR

Vernal B. Forbes, Idaho Falls, Idaho

Application August 25, 1953, Serial No. 376,392

3 Claims. (Cl. 198—102)

This invention relates to agricultural equipment, and more particularly to a novel dump elevator for use in conjunction with a potato harvester.

The primary object of this invention resides in the provision of a dump elevator which provides means for conveying potatoes or other crop harvested from the ground to a location whereby it may be readily transferred to an accompanying vehicle or other suitable receiving apparatus.

The construction of this invention features an endless series of flexible and resilient buckets which are so arranged that they pass adjacent to the digger conveyor. The buckets receive the potatoes or other similar crop and convey them to a tilting platform from whence the potatoes are conveyed to a vehicle positioned alongside the harvester. Utilized in the invention are buckets formed from a framework covered with suitable layers of natural rubber.

One of the novel elements of construction of this invention resides in the cooperation of a vertically extending support guide which is engaged by rollers mounted on the buckets, the support guide and a tilting shield cooperating to overturn the buckets so as to discharge the contents thereof.

Still further objects and features of the invention reside in the provision of an inside dump elevator for a potato harvester which may be readily used in conjunction with various conventional elements of the potato harvester so as to substantially reduce the cost of harvesting potatoes while being in itself comparatively simple in construction, strong, durable, highly efficient in operation and relatively easy to maintain.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
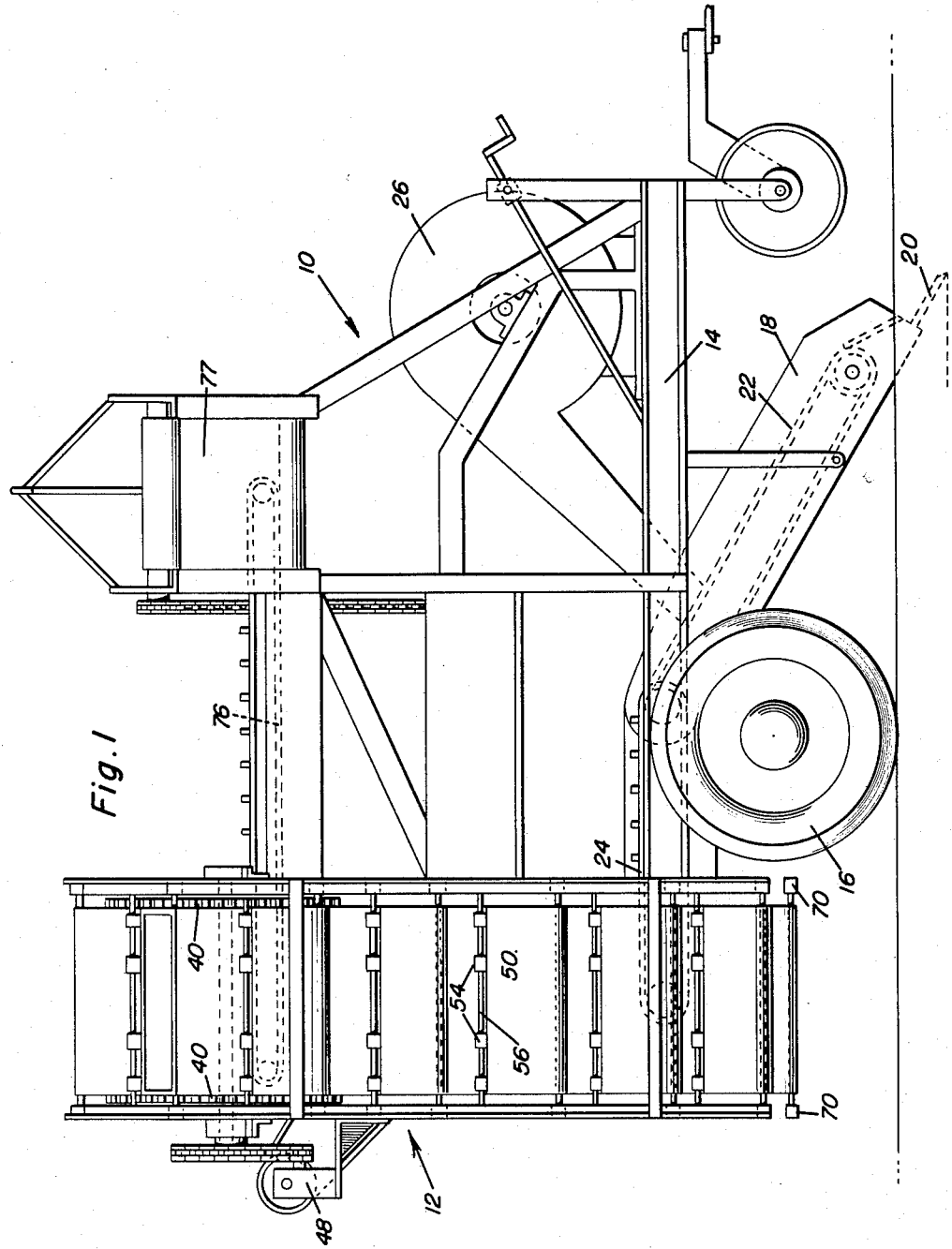
Figure 1 is a side elevational view illustrating the dump elevator as operatively installed on a potato harvester.

With continuing reference to the accompanying drawings, wherein like reference numerals designate similar parts throughout the various views, the reference numeral 10 generally designates a potato harvester on which the dump elevator, generally designated by the reference numeral 12, is adapted to be installed. The potato harvester 10 includes a framework 14 and wheels 16 forming a suitable chassis. Mounted on the framework 14 is a digger chute 18 carrying a blade 20 adapted to penetrate the soil and to disinter potatoes or like crop which are to be harvested. The digger chute 18 contains a digger conveyor 22 for delivering the crop to the conveyors 24 from whence they are transferred to the dump elevator. Obviously, a plurality of digger blades 20 and digger chains or conveyors 22 may be utilized as desired.

A motor-driven fan 26 is provided for blowing vines, weeds, dust and the like out of the rear of the harvester, and ducts 28 connect with the fan 26. A suitable source of motor power, not shown, is provided for driving the fan 26 and the other drive means utilized in this invention.

Mounted on the chassis 14 is an angle iron, substantially rectangular framework 30. Supported outwardly from the framework 30 is a pair of upwardly extending guide members 32 which are held in spaced relationship from the framework 30 by support braces 34. On the opposite side of the framework 30 at the lower portion thereof, there are provided runners 36. Above the runners 36 is an idle wheel 38. Other runners 35 provided with rollers 37 to reduce friction are mounted on the framework 30. The dump elevator 12 is driven by means of a sprocket 40 mounted on the shaft 42 driven by an endless belt 44 mounted over a drive pulley 46 and attached to the gear box 48 driven by a suitable source of power, not shown. The sprocket wheels 40 are adapted to engage the links to which the endless series of buckets 50 are attached.

Figure 3:
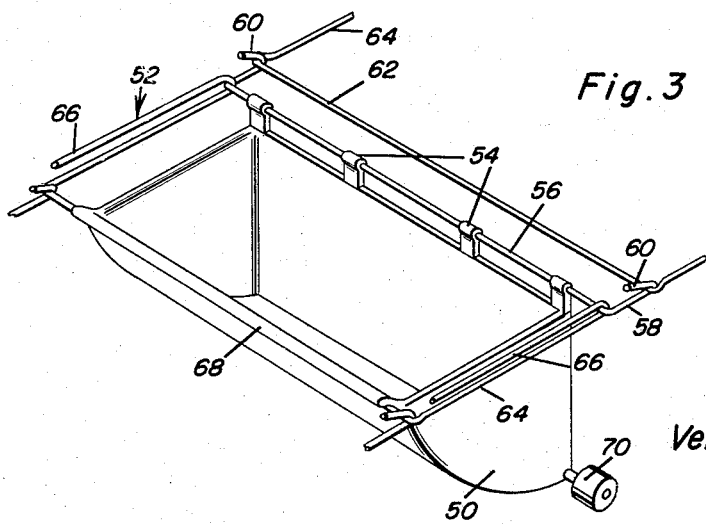
Figure 3 is a perspective view of one of the flexible and resilient buckets utilized in this invention.

As can be best seen in Figure 3, the buckets are suspended from a suitable linkage generally designated by the reference numeral 52. Each of the buckets is constructed from a suitable framework formed in a desired shape and covered with a suitable thickness of natural rubber on both the inside and outside of the frame. The buckets are then suitably heat treated. Brackets or other connecting elements 54 extend upwardly from the framework of the buckets 50 and are adapted to engage a transverse bar 56 of each of the links 58, the links having backwardly bent portions 60 which hook onto the transverse bars 62 of the links 64 following. It is to be noted that the links 64 are substantially U-shaped and have backwardly bent portions 66 adapted to hook about the transverse bars 56 of the next adjacent links 58. Thus, there is formed an endless series of links of alternating links 58 and 64.

Figure 2:
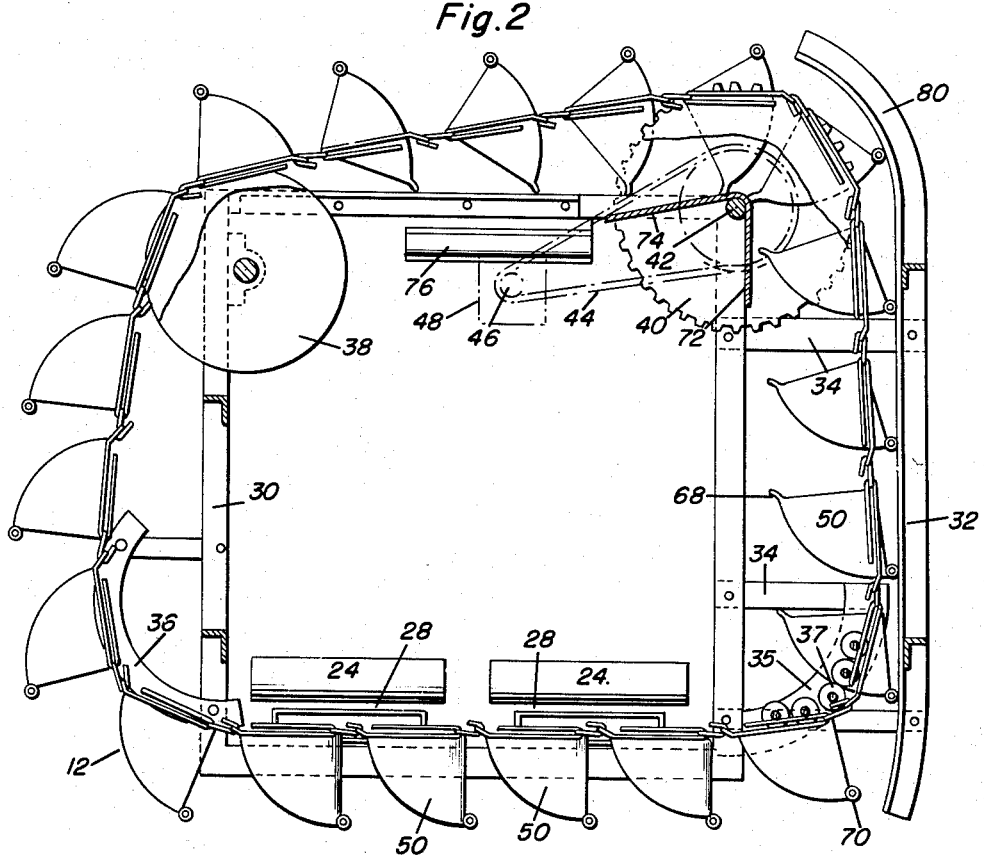
Figure 2 is an end elevational view indicating the relative position of the elements of the invention and showing in detail the engagement of the buckets with the tilting shield and upwardly extending support.

The buckets 50 have outwardly turned lips 68 which terminate at a greater distance from the transverse rods 56 than are the transverse rods 62. Thus, the transverse rods 62 form a supporting member for the lips 68 during portions of the travel of the buckets 50 and, in any event, provide a stop for movement of the buckets 50. Further, the buckets 50 carry pairs of wheels 70 which are adapted to engage the upwardly extending supports 32 in a manner as will be henceforth described and which can be best seen in Figure 2.

There is mounted on the framework 30 a suitable tilting shield 72 having an angularly downwardly extending platform 74 formed therewith. Positioned immediately below and adjacent to the platform 74 is a conveyor 76 for carrying the material received thereon to a discharge chute or conveyor 77, which is adapted to deposit potatoes or other crop on an accompanying vehicle.

The novel features of this invention reside in the manner in which the tilting shield 72 and the supports 32 cooperate to overturn the buckets 50 and deposit the material contained therein on the platform 74. After the buckets 50 have been loaded with potatoes or the like from the conveyors 24, they are carried by the linkage 52 to the position where the rollers 70 which may be formed of rubber or the like contact the supports 32. Then, because of the contact rollers 70 with the support members 32, the buckets 50 will remain in a substantially horizontal position and rotate relative to the linkage 52. The supports 32 have arcuately curved upper portions 80 and these arcuate portions are spaced at the precise distance from the tilting shield 72 so that when the buckets 50 are travelling over the arcuate portions 80 of the supports 32, the lips 68 thereof will contact the shield 72, thus frictionally retarding the outer ends of the buckets and overturning them as can readily be seen in the right-hand upper portion of Figure 2. The contents of the buckets will then be discharged upon the loading platform 74 forming a portion of the shield 72, from whence they will be deposited onto the conveyor 76.

The use of the flexible and resilient material such as rubber for the buckets 50 permits a much quieter operation for the device. Unusual results are achieved from this use of a flexible and resilient material inasmuch as the linkage 52 will not be severely strained due to the loading and unloading action of the mechanism, since the buckets 50 will act as their own shock absorbers. Hence, a much more satisfactory operation of the potato harvester can be assured.

Since, from the foregoing, the construction and advantages of this dump elevator for potato harvesters are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as now is:

1. A dump elevator for agricultural equipment comprising an endless series of links, means for actuating said links, buckets pivotally carried by said links, an upwardly extending support, rollers attached to said buckets, said rollers engaging said support, the upper end of said support being arcuate in shape, a tilting shield supported adjacent said support, said buckets each having a lip engaging said tilting shield, said arcuate upper end of said support and said tilting shield cooperating to overturn said buckets after said means for actuating said links has conveyed said buckets upwardly.

2. A dump elevator for agricultural equipment comprising an endless series of links, means for actuating said links, buckets pivotally carried by said links, an upwardly extending support, rollers attached to said buckets, said rollers engaging said support, the upper end of said support being arcuate in shape, a tilting shield supported adjacent said support, said buckets each having a lip engaging said tilting shield, said arcuate upper end of said support and said tilting shield cooperating to overturn said buckets after said means for actuating said links has conveyed said buckets upwardly, each of said buckets being constructed of a flexible resilient material.

3. In combination with a potato harvester having a chassis, a dump elevator for use in lifting potatoes for conveyance comprising an endless series of links entrained about guide members and drive means for actuating said links and flexible resilient buckets pivotally attached to said links, an upwardly extending support carried by said chassis, rollers attached to said buckets, said rollers successively engaging said support during operation of said elevator, the upper end of said support being arcuate in shape, a tilting shield supported on said harvester adjacent said support, said buckets each having a lip engaging said tilting shield, said arcuate upper end of said support and said tilting shield cooperating to overturn said buckets after said drive means has conveyed said buckets upwardly, said tilting plate having an angularly downwardly extending platform adapted to receive the contents of said buckets after said buckets have been overturned, and a conveyor belt positioned adjacent said platform for removing the contents of said buckets received on said platform.

References Cited in the file of this patent
UNITED STATES PATENTS

| | | |
|---|---|---|
| 667,975 | Dodge | Feb. 12, 1901 |
| 811,149 | Johnson | Jan. 30, 1906 |
| 1,776,856 | Horton | Sept. 30, 1930 |
| 2,220,398 | Dreikosen | Nov. 5, 1940 |
| 2,264,332 | Peterson | Dec. 2, 1941 |